(12) United States Patent
Bae et al.

(10) Patent No.: US 8,510,730 B2
(45) Date of Patent: Aug. 13, 2013

(54) SYSTEM AND METHOD FOR MANAGING APPLICATIONS OF HOME NETWORK DEVICES

(75) Inventors: Young-Kyu Bae, Suwon-si (KR); Young-Seop Han, Suwon-si (KR); Woo-Jun Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1017 days.

(21) Appl. No.: 11/584,331

(22) Filed: Oct. 20, 2006

(65) Prior Publication Data

US 2007/0192462 A1    Aug. 16, 2007

(30) Foreign Application Priority Data

Feb. 15, 2006 (KR) .................. 10-2006-0014737

(51) Int. Cl.
*G06F 9/44* (2006.01)

(52) U.S. Cl.
USPC ............ 717/173; 717/168; 717/171; 717/172

(58) Field of Classification Search
USPC .................................. 717/168–178
See application file for complete search history.

(56) References Cited

U.S. PATENT DOCUMENTS

| | | | | |
|---|---|---|---|---|
| 5,805,897 A * | 9/1998 | Glowny | ...................... | 717/178 |
| 6,009,274 A * | 12/1999 | Fletcher et al. | ............... | 717/173 |
| 6,928,468 B2 * | 8/2005 | Leermakers | ................... | 709/221 |
| 7,206,853 B2 * | 4/2007 | Eytchison et al. | ............ | 709/230 |
| 7,275,096 B2 * | 9/2007 | Green | .......................... | 709/223 |
| 7,420,956 B2 * | 9/2008 | Karaoguz et al. | ............. | 370/338 |
| 7,609,668 B1 * | 10/2009 | Smith | ........................... | 370/328 |
| 7,617,514 B2 * | 11/2009 | Szucs et al. | ..................... | 725/85 |
| 7,689,510 B2 * | 3/2010 | Lamkin et al. | .................. | 705/51 |
| 7,831,967 B2 * | 11/2010 | Won et al. | ...................... | 717/172 |
| 2003/0046437 A1 * | 3/2003 | Eytchison et al. | ............ | 709/250 |
| 2003/0046676 A1 * | 3/2003 | Cheng et al. | .................. | 717/173 |
| 2003/0101255 A1 * | 5/2003 | Green | .......................... | 709/223 |
| 2003/0121032 A1 * | 6/2003 | Cho et al. | ...................... | 717/173 |
| 2004/0031058 A1 * | 2/2004 | Reisman | ....................... | 725/112 |
| 2004/0205766 A1 * | 10/2004 | Lee et al. | ...................... | 719/311 |
| 2005/0086322 A1 * | 4/2005 | Park | ............................. | 709/217 |
| 2005/0210513 A1 * | 9/2005 | Szucs et al. | ..................... | 725/80 |
| 2006/0020589 A1 * | 1/2006 | Wu et al. | .......................... | 707/3 |
| 2006/0031828 A1 * | 2/2006 | Won et al. | ..................... | 717/168 |
| 2006/0075100 A1 * | 4/2006 | Stirbu | .......................... | 709/225 |
| 2006/0159109 A1 * | 7/2006 | Lamkin et al. | ................ | 370/401 |
| 2006/0161635 A1 * | 7/2006 | Lamkin et al. | ................ | 709/217 |
| 2006/0179079 A1 * | 8/2006 | Kolehmainen | ............. | 707/104.1 |
| 2006/0184972 A1 * | 8/2006 | Rafey et al. | ..................... | 725/80 |
| 2007/0127394 A1 * | 6/2007 | Stirbu et al. | .................... | 370/254 |

OTHER PUBLICATIONS

Marples et al., "The Open Services Gateway Initiative: An Introductory Overview," Dec. 2001, IEEE, p. 110-114.*

(Continued)

*Primary Examiner* — Qing Chen
(74) *Attorney, Agent, or Firm* — The Farrell Law Firm, P.C.

(57) ABSTRACT

Disclosed is a system and a method for managing applications installed in home network devices (HNDs) providing services on an Open Service Gateway initiative (OSGi®) framework. In the system, a mobile hand-held device (MHD) including a display unit is defined as the subject of application management between a plurality of HNDs and an application server for storing applications of the HNDs. Service frameworks existing in a plurality of HNDs including vehicle devices are based on OSGi®, and interoperation between the MHD and the HNDs depends on a Digital Living Network Alliance® (DLNA®) standard.

19 Claims, 4 Drawing Sheets

(56) References Cited

OTHER PUBLICATIONS

Moon et al., "Universal Home Network Middleware Guaranteeing Seamless Interoperability among the Heterogeneous Home Network Middleware," Aug. 2003, IEEE, p. 546-553.*

Kang et al., "UPnP AV Architectural Multimedia System with a Home Gateway Powered by the OSGi Platform," 2005, IEEE, p. 87-93.*

Moon et al., "Design of a Universal Middleware Bridge for Device Interoperability in Heterogeneous Home Network Middleware," Feb. 2005, IEEE, p. 314-318.*

Matsubara et al., "Design and Implementation of a Net-enabled DTV Using DLNA Features," 2006, IEEE, p. 119-120.*

* cited by examiner

SYSTEM AND METHOD FOR MANAGING APPLICATIONS OF HOME NETWORK DEVICES

PRIORITY

This application claims priority under 35 U.S.C. §119 to an application entitled "System and Method for Managing Applications of Home Network Devices" filed in the Korean Intellectual Property Office on Feb. 15, 2006 and assigned Serial No. 2006-14737, the contents of which are incorporated herein by reference.

BACKGROUND OF THE INVENTION

1. Field of the Invention

The present invention relates generally to a system and method for managing applications of a plurality of home network devices (HNDs), and in particular, to a system and method for managing applications of a plurality of HNDs to integratedly manage the applications of the plurality of HNDs using a mobile hand-held device (MHD).

2. Description of the Related Art

A home network system is a system for controlling home network devices (HNDs), such as a TV, an audio system, a personal computer (PC), an air conditioner, a refrigerator, a microwave, an oven, and so on, by connecting the HNDs using a single home network at home. To construct a home network system, a method of constructing a common virtual computing environment known as middleware in HNDs distributed throughout a home and providing applications on the middleware has been suggested. The middleware enables communication between various HNDs in a home network and typically includes middleware that is compatible with one or more standard, such as the Home AV Interoperability (HAVI) standard and the Universal Plug and Play (UPnP) standard.

However, to enhance user convenience and system compatibility, the installation of up-to-date applications in addition to applications provided when HNDs were purchased has increased.

According to this trend, techniques for providing new applications to HNDs have been being developed. A representative platform of these home network techniques includes the Open Service Gateway initiative (OSGi®). The OSGi® provides a service execution environment, which is installed in a home gateway and can receive and operate various external services based on interoperation of a plurality of HNDs operating in a home network.

FIG. 1 is a block diagram illustrating a conventional application installation method. As illustrated in FIG. 1, an application server 110 stores various application files per HND vendor and installs the stored application files into a plurality of HNDs 140A-C through a gateway 120.

However, if each of the HNDs provides a user interface, when most HNDs at home are OSGi®-based devices, since each HND vendor provides a different user interface, it is inconvenient for a user to install application files. That is, a common user interface without vendor distinction for the user to manage an OSGi® life cycle for each HND is not provided.

If a certain HND does not provide a display function, the user must use a Web page type control page provided by a corresponding HND vendor. To do this, the user can access the control page only if the HND is connected to another HND in a home network. Thus, in an application update method of an HND operating on an OSGi® framework, the OSGi® framework manages life cycles of OSGi® applications downloaded from a repository provided by a corresponding HND vendor existing in a remote network, and then, a corresponding service is executed in the HND. Herein, the OSGi® framework performs the life cycle management using 'install', 'uninstall', 'update', 'start', 'stop', and so on. Repositories provided by each HND vendor include a repository for a basic service bundle and other repositories suitable for the user's taste and HNDs' functionality.

However, according to the application update method, location information to access a Web page or telnet for providing a life cycle management control of each HND must be determined (e.g., by the user) and input.

An application update time is determined using the methods described below. Firstly, as an automatic method, the application update time is automatically determined by the OSGi® framework periodically checking repositories corresponding to registered OSGi® applications and determining whether corresponding versions are changed. Secondly, as a manual method, the user directly determines whether registered applications are collectively or selectively updated.

In the first method, since the user's intention is not reflected on the content to be updated, even content not to be updated may be updated regardless of the user's desire. In addition, a separate display unit is required to check the updated content, and if an HND does not include a display unit, the updated content of the HND must be checked using another HND including a display unit.

In the second method, in a state where the user cannot determine whether applications are updated in repositories, even if the user individually requests update of applications of all HNDs, the update is performed only if updated applications exist in the application server, and therefore, efficiency and convenience of management of each HND is reduced.

As described above, various conventional home network middleware only separately control and manage HNDs existing at home using unique methods, but it is difficult for the conventional home network middleware to integratedly manage information of the HNDs. Moreover, in the prior art, it is difficult to check whether applications have been updated in an HND which does not include a display unit.

SUMMARY OF THE INVENTION

An object of the present invention is to substantially solve at least the above problems and/or disadvantages and to provide at least the advantages below. Accordingly, an object of the present invention is to provide a system and method for managing applications of a plurality of home network devices (HNDs) to manage the applications of the plurality of HNDs using a mobile hand-held device (MHD).

According to one aspect of the present invention, there is provided a method of managing applications of a plurality of home network devices (HNDs), the method including obtaining, by a mobile hand-held device (MHD), application information through middleware, which can support the HNDs, from HNDs supporting the middleware among the plurality of HNDs; generating a user interface to manage the applications of the HNDs based on the obtained information; if an updated request is input through the user interface, determining applications required to be updated; and if an update is required, downloading updated applications from an application server and updating applications of corresponding HNDs.

According to another aspect of the present invention, there is provided a system for managing applications of a plurality of home network devices (HNDs), the system including an application server for storing applications for the HNDs; the plurality of HNDs for performing an update by receiving updated applications from the application server; and a mobile hand-held device (MHD) for obtaining application information through middleware, which can support the HNDs, from HNDs supporting the middleware among the plurality of HNDs, generating a user interface to manage the applications of the HNDs based on the obtained information, and, if an updated request is input through the user interface, determining applications required to be updated and transferring the applications.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

The present invention implements a function of managing applications installed in home network devices (HNDs) providing services on an Open Service Gateway initiative (OSGi®) framework. To do this, the system and method of the present invention determines a mobile hand-held device (MHD) including a display unit as the subject of an application management between a plurality of HNDs and an application server for storing applications of the HNDs. Service frameworks existing in a plurality of HNDs including vehicle devices according to the present invention are based on OSGi®, and interoperation between the MHD and the HNDs depends on a Digital Living Network Alliance® (DLNA®) standard (hereinafter DLNA®).

DLNA® provides middleware for sharing multimedia data among devices, and in the present invention, a method of updating OSGi® applications in a plurality of HNDs using a Mobile Hand-Held Service (MHS) added to a DLNA® 1.5 specification based on a DLNA® 1.0 specification is disclosed.

In particular, in the present invention, an MHD for managing OSGi® applications using a HyperText Transfer Protocol (HTTP) for media transport defined in a DLNA® stack and Universal Plug and Play Device Architecture (UPnP DA) for device discovery and device control is disclosed. To manage the OSGi® applications, a mobile digital media controller (M-DMC) acting as a control point and a mobile digital media uploader (M-DMU) acting as an uploader are implemented in the MHD. Using the MHD, service applications of all HNDs existing at home, which operate on an OSGi® framework, can be updated with up-to-date applications provided by corresponding HND vendors, and life cycles of the applications can be managed.

A system for managing applications of a plurality of HNDs in which the above-described functions are implemented will now be described with reference to FIG. 2 which is a block diagram illustrating a system for managing applications according to the present invention.

Figure 1:
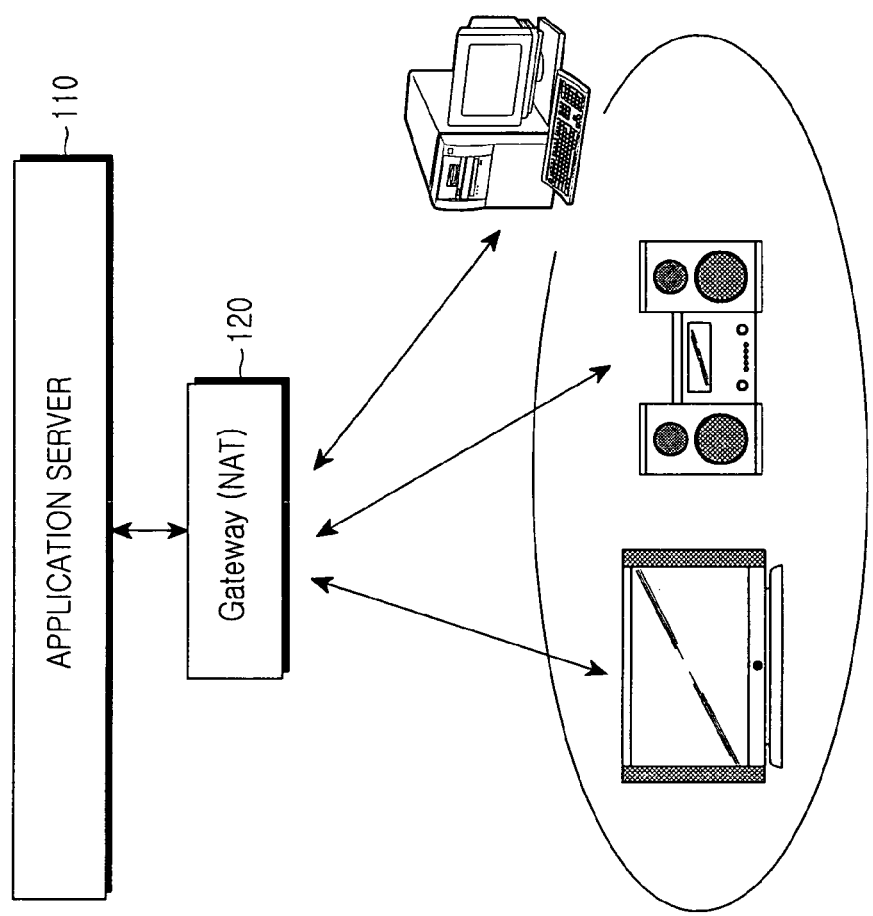
FIG. 1 is a block diagram illustrating a conventional application installation method.
Figure 2:
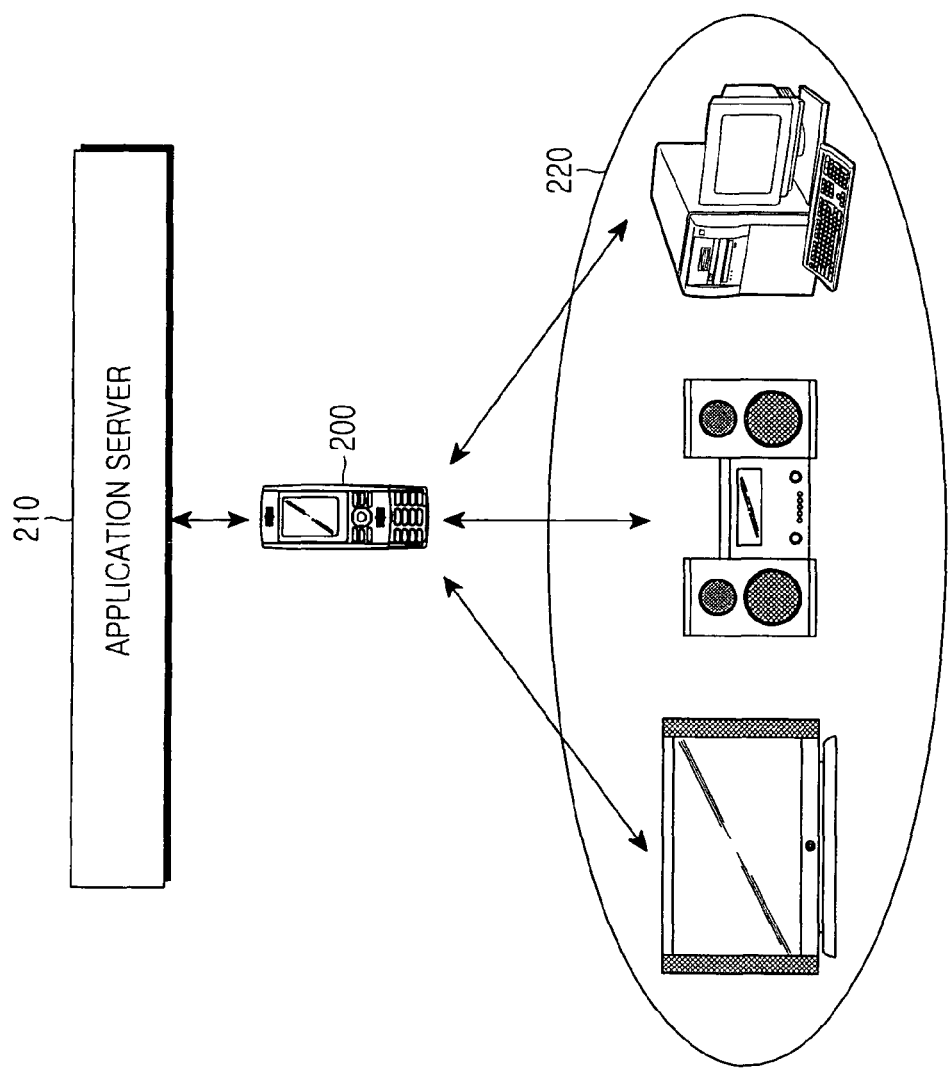
FIG. 2 is a block diagram illustrating a system for managing applications according to the present invention.

Referring to FIG. 2, the system according to the present invention includes an application server 210, an MHD 200, and a plurality of HNDs 220.

The application server 210 includes an OSGi® service application repository provided by each HND vendor and may provide version information of applications which may include one or more of past, present and/or future version information. In addition, when a polling method is used, if the MHD 200 registers application version information of each of the plurality of HNDs 220, the application server 210 determines an update time based on the registered application version information and provides corresponding updated applications to the MHD 200.

The application server 210 and/or the MHD 200 may provide a display unit, which is a user interface, in order for a user to easily manage applications of the plurality of HNDs 220. Using the display unit, information on the plurality of HNDs 220 is displayed on the MHD 200 through UPnP in a DLNA® stack and managed. Thus, the user can easily check information on applications displayed on the display unit. In addition, the MHD 200 checks a list of applications supportable by the plurality of HNDs 220 using DLNA®, which is middleware. The MHD 200 performs an application version check of all HNDs 220 when the user checks the application list, or if necessary, the MHD 200 directly performs the application version check. In other words, to complement non-reflection of a user's intention in a conventional user's manual update request or a conventional periodical update request when update is performed, the user can manage application information, e.g., version information, of the plurality of HNDs 220 registered in the MHD 200. To do this, the MHD 200 can interactively provide the application information to the user. When the version information is confirmed, the MHD 200 registers the version information in the application server 210.

If the MHD 200 previously receives and stores the version information on applications from the application server 210, the MHD 200 compares version information contained in application information received from the plurality of HNDs 220 to the stored version information, and if they are not the same, the MHD 200 accesses the application server 210 and requests the application server 210 for updated applications.

Each of the plurality of HNDs 220 runs an OSGi®-based application, and if a DLNA® format query is received from the MHD 200, each of the plurality of HNDs 220 transmits a description thereof, i.e., device description, to the MHD 200. Each of the plurality of HNDs 220 stores a Uniform Resource Location (URL) for updating applications, and if the MHD 200 requests a certain HND 220 for a URL, the HND 220 transmits the stored URL to the MHD 200. That is, the HND 220 transmits a URL provided by a corresponding HND vendor to the MHD 200 in order to receive applications suitable for the HND 220 from the application server 210. Accordingly, the MHD 200 downloads application information from the URL of the HND 220, accesses the application server 210 based on the application information, downloads corresponding applications, and uploads the downloaded applications to the HND 220.

Since the MHD 200 integratedly manages life cycles of OSGi® applications of the plurality of HNDs 220 in the above-described system, in terms of the application server 210 for a home service, communication can be performed without taking into consideration a description of each of the plurality of HNDs 220, and in terms of each of the plurality of HNDs 220, only if DLNA®, a type of middleware, is supported, connection to the application server 210 via the MHD 200 can be performed.

Figure 3:
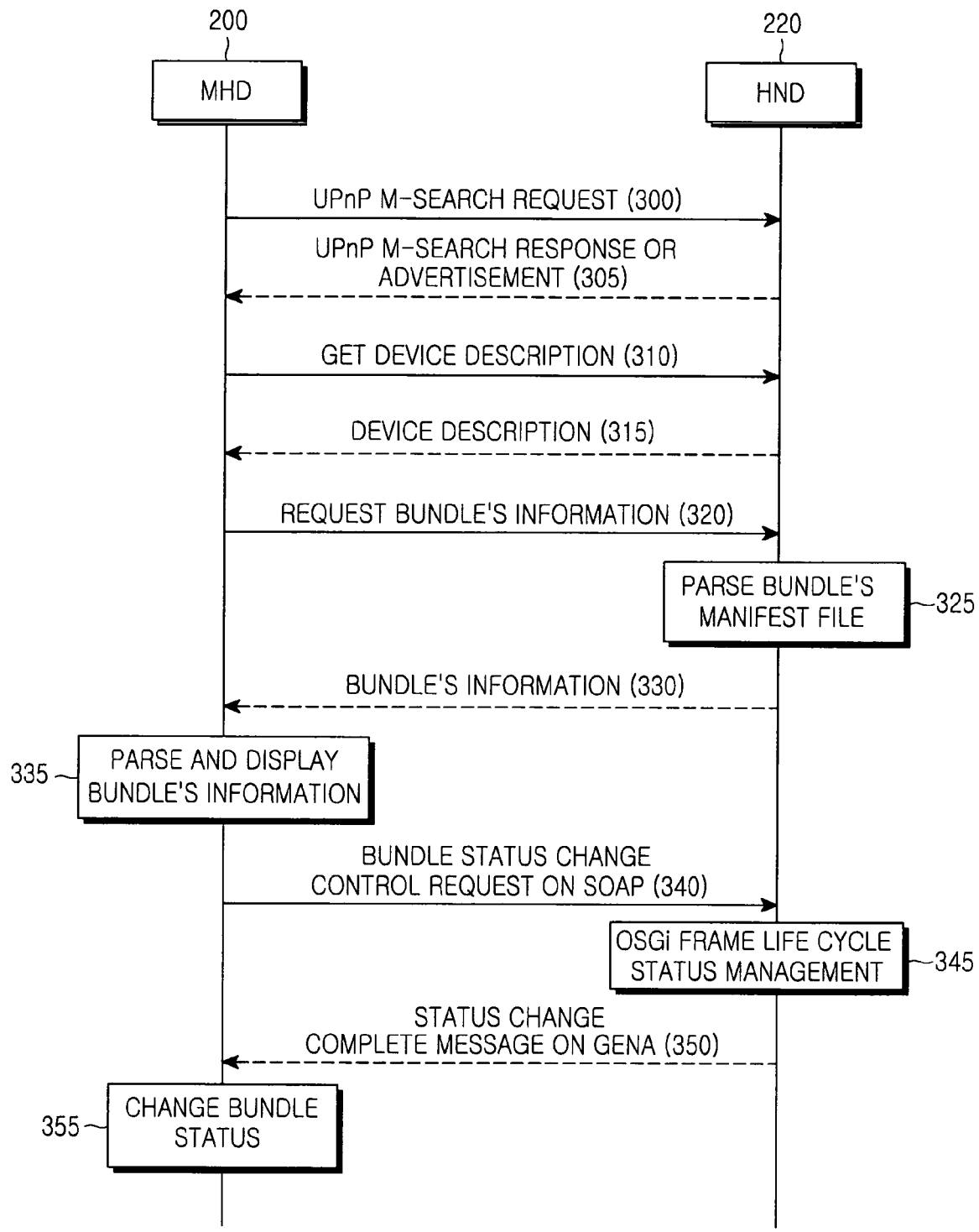
FIG. 3 is a flow diagram illustrating an integrated application management process according to the present invention.

FIG. 3 is a flow diagram illustrating an integrated application management process in the system of FIG. 2 according to the present invention. FIG. 3 illustrates a process for the MHD 200 to manage applications of an HND 220. Although only one HND 220 is illustrated in FIG. 3, the same procedures may be performed between the MHD 200 and the plurality of HNDs 220. Hereinafter, OSGi®-based applications are called a bundle. In addition, it is assumed that the MHD 200 performs a message transmission/reception with the HND 220 through the DLNA®, which includes middleware, and the HND 220 converts OSGi®-based data to an MHD recognizable DLNA® format data and transmits the converted data to the MHD 200.

In step 300, the MHD 200 transmits a UPnP M-search request message to the HND 220. Herein, the UPnP M-search request message is transmitted to the plurality of HNDs 220 in a multicast form and determines which HND supports the DLNA®. Hereinafter, reference numeral of any HND supporting the DLNA® is 220. In step 305, the HND 220 supporting the DLNA® transmits a UPnP M-search response message to the MHD 200. Herein, the HND 220 supporting the DLNA® can advertise that it supports support the DLNA® even though the UPnP M-search request message is not received.

Thus, the MHD 200 can confirm the HND 220 supports the DLNA® and transmits a get device description message to the confirmed HND 220 in step 310. In response to the get device description message, the HND 220 transmits a device description message to the MHD 200 in step 315. In the device description message, an element indicating a location of OSGi® bundle information may be added according to the present invention. The OSGi® bundle information includes bundle identification (ID), name, version, repository URL, life cycle status, function description, and version description.

If the device description message including path information of a URL of the HND 220, which contains the OSGi® bundle information, is received, the MHD 200 parses the URL path information. If a user requests the MHD 200 for OSGi® bundle information of HNDs 220 linked to the MHD 200, the MHD 200 transmits a corresponding request bundle information message to a corresponding HND 220 in step 320. If the request bundle information message is received, the HND 220 parses a bundle manifest file corresponding to a predetermined bundle in step 325 and transmits a bundle information message to the MHD 200 in step 330. That is, the MHD 200 downloads bundle information from the URL containing the OSGi® bundle information using an instruction such as 'http-get'. Herein, the bundle information of the HND 220 can be transmitted in a format such as extensible markup language (XML), hypertext markup language (HTML), or wireless markup language (WML), and the MHD 200 parses the bundle information in step 335 and displays the parsing result in a desired user interface form so that the user can view the bundle information and status corresponding to the HND.

Thereafter, the user can check and change a current bundle life cycle status of each HND 220 using the user interface. If a status change command is input from the user, the MHD 200 transmits a bundle status change control request on simple object access protocol (SOAP) message to the HND 220 in step 340. In step 345, the HND 220 performs OSGi® frame life cycle status management, and if the OSGi® frame life cycle status management is completed, the HND 220 transmits a status change complete message on general event notification architecture (GENA) message to the MHD 200 in step 350. In response to the status change complete message on GENA message, the MHD 200 changes a bundle status on user interface (UI) in step 355. That is, the MHD 200 reconstructs a user interface on which the bundle status is displayed.

For example, if the user who has confirmed that an HND A is in a state where a bundle B has started, inputs a stop command for changing to a stop status using a user interface, the stop command is transmitted to the HND A with a bundle ID through a SOAP message. The HND A stops the bundle B corresponding to the transmitted bundle ID, and if the HND A successfully stops the bundle B, the HND A transmits information indicating that the bundle B is in the stop status to the MHD 200 through a GENA message to change a state of the bundle B on the user interface of the MHD 200 to the stop status. Herein, life cycle statuses, such as install, uninstall, update, start, and stop, can be managed by the MHD 200.

Figure 4:
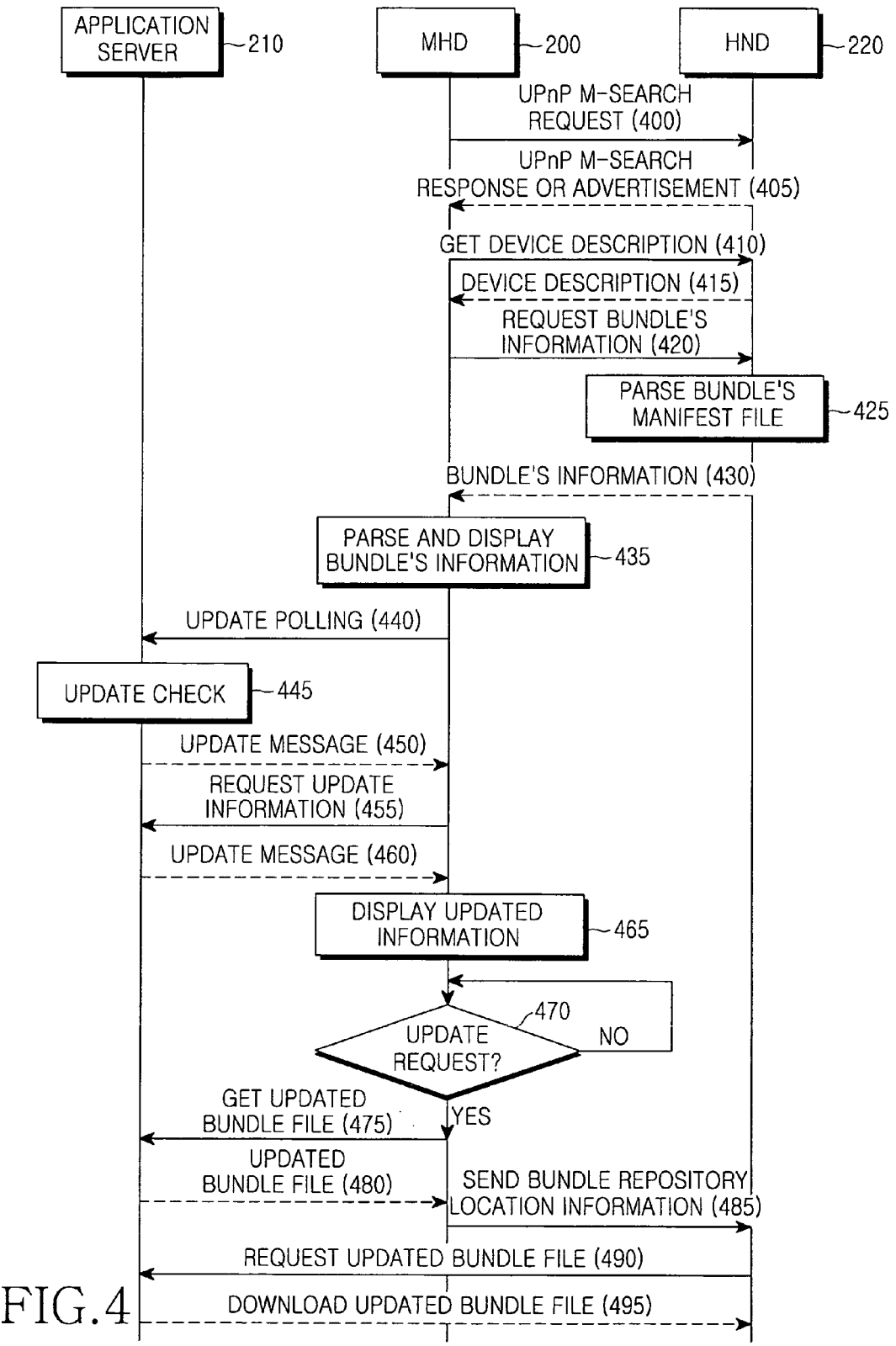
FIG. 4 is a signaling diagram illustrating an update process for integrated application management in the system of FIG. 2 according to a preferred embodiment of the present invention.

FIG. 4 is a flow diagram illustrating an update process for integrated application management in the system of FIG. 2 according to the present invention. Since steps 400 to 435 of FIG. 4 are the same as steps 300 to 335 of FIG. 3, detailed description is omitted herein.

To update a bundle of an HND 220, it must be determined which repository of the application server 210 is used to download a necessary bundle, which bundle is downloaded, and whether the bundle to be downloaded must be updated. To do this, a bundle repository URL, a bundle name, version information, and so on must be obtained for example from received bundle information corresponding to a predetermined bundle. The MHD 200 can update bundle version information from a bundle repository of the application server 210 using the bundle information with respect to bundles of HNDs 220 registered in a control point function, and two methods are disclosed in the present application.

One method is a polling method in which the application server 210 is the subject of update determination according to the present invention. Steps 440 to 450 of FIG. 4 indicate the polling method. In the polling method, if the MHD 200 periodically transmits bundle information, i.e., a bundle name and version information, to a repository URL of the application server 210, the application server 210 determines whether a bundle version corresponding to the received bundle name has been updated. If an updated bundle exists, the application server 210 informs the MHD 200 that an updated bundle exists and transmits a location of the updated bundle to the MHD 200. In other words, if the MHD 200 transmits an update polling message to the application server 210 in step 440, the application server 210 performs an update check in step 445 to directly determine whether to perform an update process, and if the update process is necessary, the application server 210 transmits an update message to the MHD 200 in step 450. That is, the application server 210 determines whether an updated bundle per HND exists based on the bundle's information, and if an updated bundle exists, the application server 210 transmits the updated bundle to the MHD 200.

Another polling method is a method in which the MHD 200 is the subject of an update determination. Steps 455 and 460 of FIG. 4 indicate this method. In this method, the MHD 200 receives version information of bundles first, and if the version information is changed, the MHD 200 requests the application server 210 for an update process. In other words, the MHD 200 transmits a request update information message to the application server 210 in step 455. In response to the request update information message, the application server 210 transmits an update message including version information to the MHD 200 in step 460.

Using any one of the above-described methods, before a bundle is downloaded from a repository of the application server 210, a description of the version information and the updated content of the bundle is transmitted. Accordingly, the MHD 200 displays updated information in step 465, and the user can directly decide an update start operation after checking the displayed information. That is, a menu is implemented for the user to check whether bundles are updated and directly determine whether an updated bundle has been downloaded by displaying update information of each of the bundles on the user interface of the MHD 200. Using this menu, the user can check which function of which one of the HNDs 200 is updated before an update process is performed, and if the user wants to maintain a previous version, the user can reject the update process.

To do this, the MHD 200 determines in step 470 whether an update request is input from the user using an update start menu on the user interface. If the update request is input as the determination result, the MHD 200 transmits a get updated bundle file message to the application server 210 in step 475. In response to the get updated bundle file message, the application server 210 transmits an updated bundle file to the MHD 200 in step 480. In other words, if the user finally decides the update start operation, a Java® archive (jar) file of a bundle is temporarily stored in the MHD 200 from the repository of the application server 210. In step 485, the MHD 200 transmits a send bundle repository location information message to the HND 220 to ask in which location an updated bundle is stored. In response to the send bundle repository location information message, the HND 220 requests the updated bundle file in step 490 and downloads the updated bundle file via the MHD 200 in step 495. That is, the MHD 200 allows an HND 220 requiring an update process to directly download a new bundle jar file and update an existing bundle jar file by transmitting repository location information of a corresponding bindle to the HND 220. In another embodiment, the MHD 200 updates an existing bundle jar file by overlapping the existing bundle jar file through a file upload in a state of uninstalling a corresponding bundle of an HND 220 requiring an update process using an upload function of a DLNA® class.

As described above, the MHD 200 allows the user to easily perform OSGi® life cycle management and update of bundles of all HNDs linked to the MHD 200 using DLNA®, which is middleware, by implementing a menu for managing bundles of all HNDs at home using the user interface.

As described above, according to the present invention, a user can easily manage applications of HNDs at home and in vehicle devices at any time using an MHD. In addition, by using a user interface of the MHD, management of applications of all HNDs can easily and interactively be performed without an additional operation as in the case when the MHD and the HNDs are interoperated using the UPnP standard. Furthermore, by automatically informing the user of updated content and allowing the user to determine whether an update process is to be performed, update of all HNDs linked to the MHD can be efficiently performed. In addition, by using conventional standards, such as OSGi® and DLNA®, to implement these functions, compatibility, which is an important element for interoperation between devices, can be maintained.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of managing applications of a plurality of home network devices (HNDs), the method comprising:
obtaining, by a mobile hand-held device (MHD), application information through middleware, which can support the plurality of HNDs, from one or more HNDs supporting the middleware among the plurality of HNDs, wherein the application information is information for an application installed in the one or more HNDs;
displaying a user interface at the MHD to manage the applications in the plurality of HNDs based on the obtained application information whereby a user changes an application life cycle status of each of the one or more HNDs using the user interface of the MHD, wherein the application life cycle status can be one of install, uninstall and update;
determining applications of the plurality of HNDs that are required to be updated by the MHD;
if an update request is input by a user through the user interface of the MHD, downloading updated applications from an application server and updating applications of corresponding HNDs;
transmitting an application life cycle status change control request to the one or more HNDs supporting the middleware to perform application life cycle status management using the user interface of the MHD;
determining, in response to transmitting the application life cycle status change control request, whether an application life cycle status change has been completed in the one or more HNDs supporting the middleware; and
if the application life cycle status change has been completed, reconstructing the user interface of the MHD.

2. The method of claim 1, wherein the middleware is compatible with a multimedia management specification and supports communication between the MHD and the plurality of HNDs.

3. The method of claim 1, wherein the one or more HNDs supporting the middleware from among the plurality of HNDs operate on a service framework.

4. The method of claim 1, wherein the step of obtaining the application information comprises:
multicasting, by the MHD, a query for inquiring whether the middleware is supported to the plurality of HNDs;
receiving a response from the one or more HNDs supporting the middleware from among the plurality of HNDs in response to the query;
requesting the one or more HNDs supporting the middleware for FIND description and obtaining the HND description; and
requesting the one or more HNDs supporting the middleware for application information based on the HND description and obtaining the application information.

5. The method of claim 4, wherein the HND description includes a location of the application information, and the application information includes at least one of application identification (ID), name, version, repository Uniform Resource Location (URL), life cycle status, function description, and version description.

6. The method of claim 1, wherein the step of obtaining the application information comprises:
   receiving, by the MHD, middleware format application information from the one or more HNDs supporting the middleware; and
   parsing the received middleware format application information.

7. The method of claim 1, wherein the step of determining the applications of the plurality of HNDs that are required to be updated comprises:
   transmitting, by the MHD, the application information to the application server; and
   determining, by the application server, based on the application information whether updated applications exist for each of the one or more HNDs supporting the middleware.

8. The method of claim 1, wherein the step of determining the applications of the plurality of HNDs that are required to be updated comprises:
   receiving, by the MHD, version information of the applications from the application server and storing the received version information;
   if the application information is obtained, checking version information from the application information and comparing the version information to the stored version information; and
   if the version information is not the same as the comparison result, accessing the application server and requesting the application server for updated applications.

9. The method of claim 1, wherein the step of updating the applications of corresponding HNDs includes storing, by the MHD, the updated applications received from the application server, and if the update request is input using the user interface of the MHD, uploading the updated applications to the corresponding HNDs.

10. The method of claim 1, wherein the step of updating the applications of corresponding HNDs comprises:
    transmitting to the corresponding HNDs, by the MHD, location information of the updated applications in the application server; and
    downloading, by the corresponding HNDs, the updated applications from the application server based on the location information.

11. A system for managing applications of a plurality of home network devices (HNDs), the system comprising:
    an application server configured to store applications for the plurality of HNDs;
    the plurality of HNDs configured to perform an update by receiving updated applications from the application server; and
    a mobile hand-held device (MHD) configured to obtain application information through middleware, which can support the plurality of HNDs, from one or more HNDs of the plurality of HNDs supporting the middleware, display a user interface to manage the applications in the plurality of HNDs based on the obtained application information whereby a user changes an application life cycle status of each of the one or more HNDs using the user interface of the MHD, wherein the application life cycle status can be one of install, uninstall and update, and determine applications of the plurality of HNDs that are required to be updated and download updated applications from the application server if an update request is input by a user through the user interface of the MHD, wherein the application information is information for an application installed in the one or more HNDs, wherein the MHD is further configured to transmit an application life cycle status change control request to the one or more HNDs supporting the middleware to perform application life cycle status management using the user interface of the MHD, determine, in response to transmitting the application life cycle status change control request, whether an application life cycle status change has been completed in the one or more HNDs supporting the middleware, and reconstruct the user interface of the MHD if the application life cycle status change has been completed.

12. The system of claim 11, wherein the middleware is compatible with a multimedia management specification and supports communication between the MHD and the plurality of HNDs.

13. The system of claim 11, wherein the one or more HNDs of the plurality of HNDs supporting the middleware operate on a service framework.

14. The system of claim 11, wherein the MHD is further configured to multicast to the plurality of HNDs a query for inquiring whether the middleware is supported, request the one or more HNDs supporting the middleware for HND description and obtain the HND description if a response is received from the one or more HNDs supporting the middleware among the plurality of HNDs in response to the query, and request the one or more HNDs supporting the middleware for application information based on the HND description and obtain the application information.

15. The system of claim 14, wherein the HND description includes a location of the application information, and the application information includes at least one of application identification (ID), name, version, repository Uniform Resource Location (URL), life cycle status, function description, and version description.

16. The system of claim 11, wherein if middleware format application information is received from the one or more HNDs supporting the middleware, the MHD parses the received middleware format application information.

17. The system of claim 11, wherein if the application information is transmitted from the MHD, the application server determines whether updated applications exist for each of the one or more HNDs supporting the middleware based on the application information, determines whether update is necessary, and informs the MHD of the determination result.

18. The system of claim 11, wherein the MHD is further configured to store the updated applications received from the application server and upload the updated applications to corresponding HNDs if the update request is input using the user interface of the MHD.

19. The system of claim 11, wherein the MHD is further configured to transmit location information of the updated applications in the application server to corresponding HNDs so that the corresponding HNDs can directly download the updated applications from the application server.

* * * * *